(12) United States Patent
Talkhoonche et al.

(10) Patent No.: US 11,082,744 B1
(45) Date of Patent: Aug. 3, 2021

(54) MODIFYING TRAINING DATA FOR VIDEO RESPONSE QUALITY OPTIMIZATION

(71) Applicant: Microsoft Technology Licensing, LLC, Redmond, WA (US)

(72) Inventors: Shahriar Shariat Talkhoonche, Orinda, CA (US); Mohsen Jamali, Santa Clara, CA (US); Mohammad Ali Abbasi, Cupertino, CA (US); Onkar A. Dalal, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 16/745,147

(22) Filed: Jan. 16, 2020

(51) Int. Cl.
*H04N 21/466* (2011.01)
*H04N 21/442* (2011.01)

(52) U.S. Cl.
CPC ... *H04N 21/4663* (2013.01); *H04N 21/44204* (2013.01)

(58) Field of Classification Search
CPC .............. H04N 21/4663; H04N 21/44204
See application file for complete search history.

(56) References Cited

U.S. PATENT DOCUMENTS

| 10,607,086 | B1 * | 3/2020 | Grady | G06F 16/958 |
| 2016/0034786 | A1 * | 2/2016 | Suri | G06K 9/6256 382/159 |
| 2016/0314410 | A1 * | 10/2016 | Carmichael | H04N 21/4668 |
| 2017/0295374 | A1 * | 10/2017 | Aaron | H04N 19/154 |
| 2018/0084310 | A1 * | 3/2018 | Katz | G06Q 30/0242 |
| 2018/0167619 | A1 * | 6/2018 | Li | H04N 19/154 |
| 2019/0220525 | A1 * | 7/2019 | Song | G06N 20/00 |
| 2020/0272937 | A1 | 8/2020 | Jamali et al. | |
| 2021/0027065 | A1 * | 1/2021 | Chung | G06K 9/00718 |
| 2021/0099715 | A1 * | 4/2021 | Topiwala | H04N 19/103 |

\* cited by examiner

*Primary Examiner* — Oschta I Montoya
(74) *Attorney, Agent, or Firm* — Hickman Becker Bingham Ledesma LLP

(57) ABSTRACT

Techniques for modifying training data for video response quality optimization are provided. In one technique, training data is identified that is generated based on video presentation data that indicates multiple video items were presented to multiple entities. The training data comprises multiple training instances, each indicating a presentation of at least a portion of a video item to an entity. For each training instance in a subset of the training instances, a quality metric of the presentation of the video item indicated in said each training instance is computed and that training instance is modified based on the quality metric. After modifying one or more of the training instances, the model is trained using one or more machine learning techniques. In response to a content request, the model is used to determine whether to transmit a particular video item over a network to a computing device of a particular entity.

18 Claims, 4 Drawing Sheets

MODIFYING TRAINING DATA FOR VIDEO RESPONSE QUALITY OPTIMIZATION

TECHNICAL FIELD

The present disclosure relates to online video items and, more particularly, to leveraging online video engagement to train machine-learned models for video engagement prediction.

BACKGROUND

The Internet has enabled the delivery of electronic content to billions of people. Sophisticated techniques have been explored and implemented to identify content that is relevant to viewers that are requesting other content. Such techniques may involve hundreds and thousands of computations that occur for a single request. If processing a content request results in identifying irrelevant content, then poor user experience results and content providers will choose other content exchanges to delivery their respective content. Thus, processing of content requests from remote computing devices by taking into account relevant information and efficient transmission of any results of the content requests is critical.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for modifying training data that is used to train a machine-learned model. In one technique, multiple different types of engagements of video items are logged and used to generate training data. An engagement ratio is calculated for each type of engagement and with respect to each applicable entity involved in the engagement. One or more machine learning techniques are used to generate a prediction model based on the training data. In response to receiving a content request associated with a particular entity, one or more engagement ratios associated with the particular entity are identified and used to generate one or more predictions, each prediction indicating a likelihood of whether a particular action will be performed relative to a candidate video item.

Embodiments have improved computer technology in multiple ways. First, results of embodiments have shown that taking into account quality metrics of video engagements in training a model has significantly improved the accuracy of the model over past models that do not take into account these quality metrics. Therefore, more relevant video items are delivered over computer networks to client devices. In other words, electronic content delivery technology is improved. Second, the amount of resources that content providers of video items must commit to the content delivery system in order to have their video items transmitted over a computer network has reduced; thus, freeing up resources for pursuing other content delivery campaigns. Thus, electronic content delivery technology is improved through increases in efficiency.

System Overview

Figure 1:
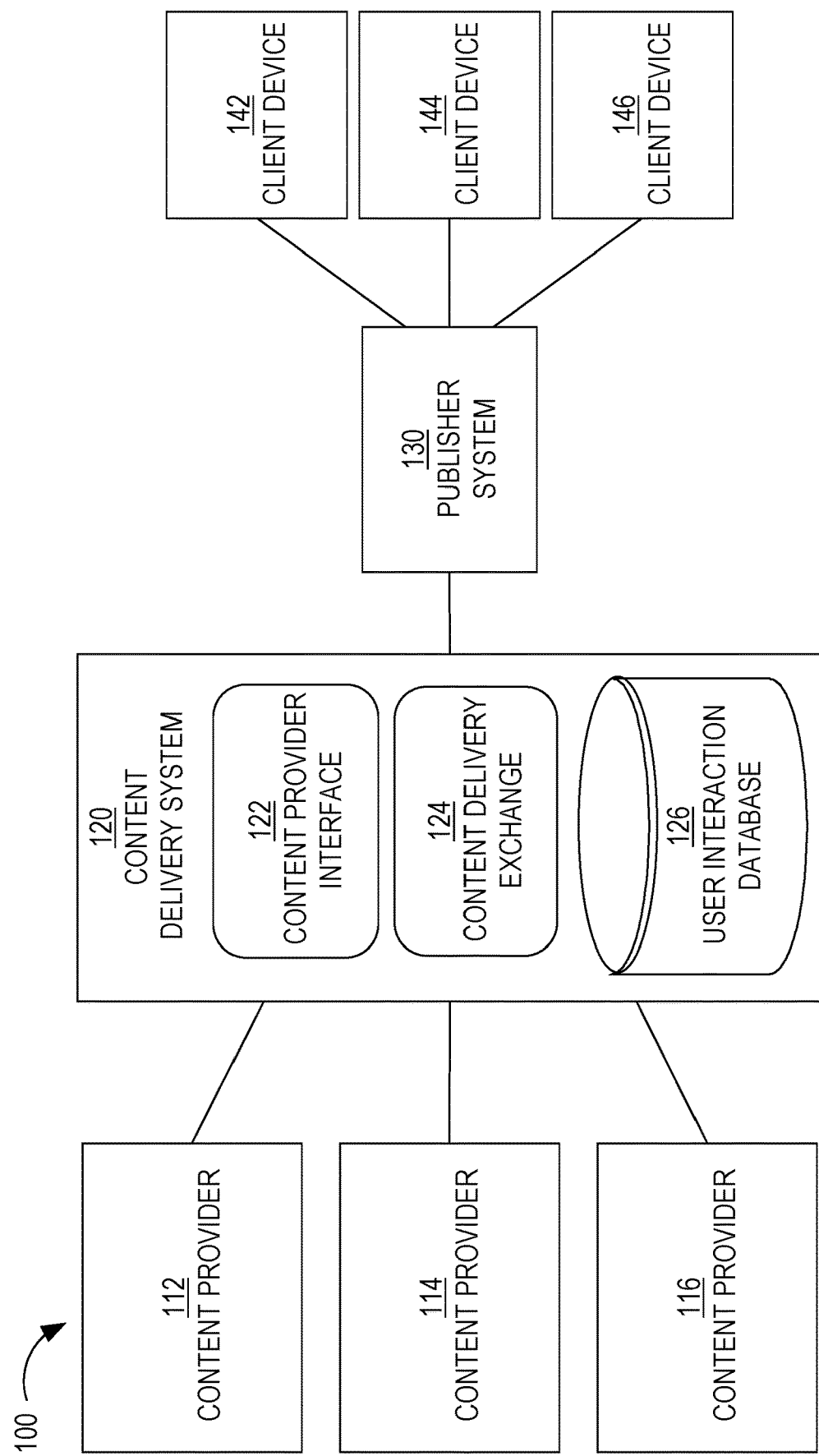
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item, across client devices 152-156 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item, content delivery system 120 may calculate a CTR for the content item.

Video Items

In an embodiment, a content item includes a video. Such content items are referred to herein as "video items." A video item not only includes video data, but may also include text, graphics, one or more images, or any combination thereof. A video player that displays a video item may include video controls, such as begin, pause, mute, unmute, rewind, forward, full screen, expand, collapse, skip, and/or replay.

A content item selection event may include one or more candidate video items and one or more non-video content items. Such a content item selection event is considered a "mixed" content item selection event or mixed auction. Different types of content items are ranked by bid, a likelihood of selection or viewing, or a combination of the two, referred to herein as ECPI, or effective cost per impression, which is calculated for each content item by multiplying the content item's bid by a likelihood that a particular user will select or view the content item. A content item from a CPM campaign will not have any such prediction; thus, an ECPI for a content item from a CPM campaign is the campaign's bid.

In an embodiment, a prediction of viewing a video of a video item (or simply "viewing a video item") depends on how much of the video is viewed or presented to the user. For example, a video may need to be presented to a user for two seconds before considering the video viewed by the user. Other periods of time (e.g., three seconds or ten seconds) may be followed.

The presentation of a video may begin automatically. For example, if three quarters of the video item is displayed (or three quarters of the video playing area is displayed), then the video automatically begins playing. Alternatively, presentation of a video may occur only in response to user input, such as the user selecting a play button control, the user tapping (with his/her finger on a touchscreen display) the video item or an image that is displayed over the video item, or the user hovering a mouse over the video item.

Logging Video Engagement

In an embodiment, engagement with video items are logged. Video engagement is detected based on events generated when a video is presented on a client device. A client application (such as a video player application, whether a native application or a web application) generates an event when a video begins playing, when a user (or entity) interacts with the video by, for example, selecting a video control button (e.g., corresponding to unmute, play, or expand), and/or when a certain amount of video is presented (e.g., the first two seconds, a quarter of the video, half of the video, three quarters of the video, and/or the entire video). Each generated video-related event includes data similar to a click data item, such as a member identifier, a client identifier, content item identifier, a timestamp (indicating a date and/or time of day), channel type (e.g., mobile or desktop), location (e.g., feed, messaging, right rail), page identifier (indicating a particular web page or application view/tab on which the video item was presented, for example, if not in the user's feed), and a type of interaction (e.g., play, pause, unmute, collapse). A video-related event also includes which portion (or an amount) of video was presented, such as two seconds, a quarter of the video, half of the video, etc. Thus, a single client application may generate multiple video-related events regarding a particular video, such as one event indicating that the particular video began to play, another indicating that two seconds of the particular video was presented, another event indicating the midpoint of the particular video was presented, another event indicating that the user selected an unmute button, another event indicating that the user selected the expand button so that the particular video covered the entire screen of the user's device, and another event indicating that the entire video was presented on the user's device.

The client application transmits any generated video-related events over a computer network to content delivery system 120. Content delivery system 120 (or a component thereof) processes the video-related events to generate training data and/or generate input feature values for different users.

Training a Prediction Model

In an embodiment, one or more machine learning techniques are used to train a prediction model for predicting whether a user (or entity) will perform an action relative to a video item. Examples actions include viewing the video item (e.g., where the video is automatically played), selecting the video item (e.g., to cause the video to be played), or selecting a particular video control button (e.g., a button to cause the video to be displayed full screen).

Training data comprises multiple training instances. Each training instance is based on a log of one or more video-related events. A video-related event may be one where a user performed the action in question or one where the user did not perform the action in question. For example, if (1) the action is viewing a video item for two seconds, (2) a video-related event indicates that an impression occurred relative to a particular user and a particular video item, and (3) there is no related event that indicates that the particular user viewed the particular video item (even for two seconds) as a result of the impression, then a training instance is created that indicates that the particular user did not perform the action relative to the particular video item. Thus, multiple video-related events are analyzed to generate such a "negative" training instance.

As another example, if (1) the action is viewing a video item for two seconds and (2) a video-related event indicates that a particular user viewed a particular video item for two seconds, then a training instance is created that indicates that the particular user performed the action relative to the particular video item. Thus, only a single video-related event is analyzed in order to generate such a "positive" training instance.

Each training instance includes numerous features, such as user features, video item features, contextual features, and user-video item features. Examples of user features include a job title of the user, industry in which the user works, current employer of the user, skills listed by the user in a user profile, number of connections of the user in an online social network, academic degrees earned by the user, academic institutions attended by the user, current residence (provided by the user), and a user selection rate of the user (e.g., number of content items the user has selected in the past divided by the number of content items that have been presented to the user).

Examples of video item features include identity of the corresponding content provider, performance of the corresponding content delivery campaign (e.g., user selection rate, number of clicks), performance of the specific video item (if the campaign includes multiple content items), length of the video, textual features of any text of the video item, and actual video or images from the video.

Examples of contextual features include time of day, day of week, type of user device, and operating system of the user device.

User-video item features are cross features such as user segment X ("cross") video topic, etc.

Each training instance includes a label that indicates whether the user performed the action in question (e.g., watching at least two seconds of the corresponding video or unmuted the volume of the corresponding video), as indicated by one or more video-related events. A label value may be a 0 (indicating that the corresponding user did not perform the action) or 1 (indicating that the corresponding user performed the action).

Example machine learning techniques that may be used to train the machine-learned model include linear regression, logistic regression, gradient boosting decision trees, Naïve Bayes, artificial neural network, support vector machines (SVMs). Embodiments are not limited to any particular machine learning technique.

After training a machine-learned model based on the training data (or a portion thereof), the machine-learned model may be validated based a portion of the training data that was not used to train the model. If the model is accurate enough (e.g., precision and recall measurements are relatively high), then the model may be used to make predictions of whether a user will perform the action in question (i.e., corresponding to the label in the training data). For each user that initiated a content request, a user/member identifier of the user is identified based on the content request and attributes of the user are identified. For each identified candidate content item (in a content item selection event), attributes of the candidate content item and the attributes of the user are input to the machine-learned model, which outputs a score that indicates a (e.g., a relative) likelihood that the user will perform the action in question (e.g., watching two seconds) relative to the candidate content item.

Quality Metric of a Video Presentation

Each training instance corresponds to a presentation (or impression) of a video item. Not all presentations of a video item are of equal value. For example, viewing the first half of the video of a video item is a stronger signal of interest than viewing the first two seconds of the video of the video item. As another example, a user skipping to the middle of a video item and viewing one second is not as strong of a signal of interest as the user viewing the first quartile of the video. Indeed, some views of different portions of a video item are accidental.

Determining that a user viewed a portion of a video item may be inferred based on events that are generated by the corresponding video player. For example, a video player may generate an event whenever a portion of the video item corresponding to a quartile marker (i.e., 25%, 50% or midpoint, 75%, and 100%) is presented. (Each of these quartile markers corresponds to a different type of event.) Thus, an event indicating that a midpoint in a video item was presented does not necessarily mean that 50% of the video item was presented. A user might have accidently skipped to the middle portion.

As another example, a video player may generate an event whenever a portion of the video item corresponding to a minute increment is presented. Again, if an event indicating that a portion of the video at the three-minute mark was presented does not necessarily mean that the entire first three minutes of the video item was presented.

Video-related events pertaining to a presentation are used to compute a quality metric indicating a measure of quality of the presentation. The quality metric is then used to modify the training instance that corresponds to the presentation.

In an embodiment, a quality score is computed for a presentation of a video item as follows:

$$\sum_{j=1}^{4} \frac{I(q_j)}{p(q_j|l)}$$

where $q_j$ is the jth quantile completion (e.g., first quartile, midpoint, third quartile, and completion) and $I(q_j)=1$ if such a (type of) video-related event exists for the presentation. If ten quantile completions are tracked for each presentation of a video item, then the summation would be from $j=1$ to $j=10$. Thus, for ten quantiles, there are ten possible types of events for each presentation.

The probability $p(q_j|l)$ is calculated for multiple presentations of one or more video items of length l. For example, multiple video items are between thirty seconds and thirty-five seconds. If 10% of the presentations of those video items resulted in $q_1$, then $p(q_1|l)=10\%$ and if 8% of the presentations of those video items resulted in $q_2$, then $p(q_2|l)=8\%$. Some video items may be reflected more in the set of presentations than other video items. For example, a first thirty-second video item may have been presented twenty times while a second thirty-second video item may have been presented two hundred times. Therefore, if these are the only two video items from which to calculate $p(q_j|l)$ for each possible value of j, then the presentations associated with the second thirty-second video item will dominate the value of $p(q_j|l)$.

The lower the value of $p(q_j|l)$, the higher the value of $I(q_j)/p(q_j|l)$ for a particular presentation where $I(q_j)=1$, and, therefore, the higher the quality score for the particular presentation. Conversely, the higher the value of $p(q_j|l)$, the lower the value of $I(q_j)/p(q_j|l)$ for a particular presentation where $I(q_j)=1$, and, therefore, the lower the quality score for the particular presentation. However, even with a high value for $p(q_j|l)$ (and, thus, a relatively low value for a quality score), the weight of the corresponding training instance may still be higher than a training instance that did not result in any video-related events other than an impression event.

Time Buckets

In an embodiment, a range of video lengths is associated with a time bucket and one or more video items whose video length falls within that range are, as a result, assigned to that time bucket. Some time buckets may have many video items assigned to them while other time buckets may have with relatively few video items assigned to them. For example, one hundred video items are assigned to a first time bucket and two video items are assigned to a second time bucket.

Also, each time bucket may have a different absolute time range. For example, one time bucket may be for video items whose length is between ten seconds and twenty seconds, while another time bucket may be for video items whose length is between four minutes and seven minutes.

Thus, when calculating a quality score for a presentation of a video item (and, therefore, a training instance that corresponds to the presentation), a length of the video item is determined and mapped to a time bucket. Once video items are assigned to time buckets according to the length of the video items, a value of $p(q_j|l)$ for video items assigned to a time bucket is computed. Thus, at the time for calculating a quality score for the presentation of the video item, the time bucket may already be associated with multiple values of $p(q_j|l)$, one for each possible value of j. If there are four possible values of j, then four values of $p(q_j|l)$ are computed for, and associated with, each time bucket.

In a related embodiment, instead of $p(q_j|l)$, the above quality score formula uses $p(q_j)$. In this way, there are no time buckets. Thus, in this embodiment, all video items are treated as if there is a single time bucket for purposes of computing $p(q_j)$. Thus, there is a single $p(q_j)$ that is used to generate a quality score for each presentation of each video item.

Alternatively, $p(q_j)$ is computed on an individual video item basis. Thus, different video items are associated with different $p(q_j)$. Thus, the quality score for different video items are based on different values of $p(q_j)$.

Training Set Specific Quality Scores

In an embodiment, $p(q_j|l)$ is calculated based on the training samples in a specific training set on which a particular prediction model is trained. Thus, $p(q_j|l)$ may have one value for a particular j and a particular/based on the training samples in one training set, while $p(q_j|l)$ may have a different value for the same particular j and same particular/based on the training samples in another training set. The values of $p(q_j|l)$ may be different even if the same set of video items are reflected in both training sets because at least one training set will include one or more presentations that are not reflected in the other training set.

Discarding Video-Related Events

In an embodiment, one or more video-related events are discarded and not used for generating a quality metric of a presentation (and, therefore, a training instance). For example, if a user accidently skips to the middle portion of a video item, causing the video player to generate a video-related event for the midpoint of the video item, and then the user does not view any more of the video item, then that presentation of the video item to the user is similar to a typical presentation of a video item where no interactions with the video item were made. Thus, for example, the value of $I(q_j)$) for that video-related event would be 0 instead of 1. Other examples of interacting with a video item that might be accidental or unintentional include selecting the play button, a skip button, and a "view later" button. Such interactions may be inferred to be accidental or unintentional if the user immediately ceases to continue watching the video item.

In an embodiment, a video-related event that logically would follow another video-related event that did not occur is automatically discarded. For example, if an entire video item is played, then five video-related events would be generated: a first event for the first two seconds, a second event for the first quartile, a third event for the midpoint, a fourth event for the third quartile, and a fifth event for the endpoint (or at point within the last five or ten seconds). If only the first event and the third event are generated for a particular presentation, then the third event is discarded because there is no second event. Similarly, if only the fourth event is generated for a particular presentation, then the fourth event is discarded because there is no third event.

In a related embodiment, if a particular video-related event is a candidate for discarding, but the particular video-related event is followed by a subsequent video-related event for the same presentation, then the particular video-related event is not discarded. The subsequent video-related event indicates that the particular video-related event might not be accidental or unintentional. For example, given the above five possible video-related events, if only the first event, the third event, and fourth event are generated for a particular presentation, then the third event is not discarded because the fourth event follows the third event.

Smoothing the Probabilities

As noted above, some time buckets may have relatively few video items assigned thereto. Thus, the value of $p(q_j|l)$ may be relatively "noisy."

In an embodiment, $p(q_i|l)$ is "smoothed" by $p(q_i)$ (which is not limited to video items of a particular length of length range) using a smoothing technique. Embodiments are not limited to any particular smoothing technique. Example smoothing techniques include Bayesian smoothing, Laplacian smoothing, and maximum a posteriori (MAP) estimation. Whatever smoothing technique is used, the greater the number of training instances that are assigned to bucket l, the more the effect that $p(q_i|l)$ will have relative to $p(q_i)$ on the denominator of the quality score function. In other words, in this scenario, $p(q_i|l)$ will have a greater effect than $p(q_i)$ on the denominator. Conversely, the fewer the number of training instances that are assigned to bucket l, the lesser the effect that $p(q_i|l)$ will have relative to $p(q_i)$ on the denominator of the quality score function.

Modifying a Training Instance

A training instance may be modified based on a quality score in one of multiple ways. For example, modifying a training instance may involve assigning a weight to the training instance. A value for a weight may be a value greater than or equal to zero. Thus, the value of a weight may be greater than one. For example, a training instance with a weight of two will be roughly equivalent to two training instances that are equivalent and that each have a weight of one.

In this example where the weight of a training instance is modified, a positive training instance whose video was viewed (e.g., for two seconds) but has not watched up to any quartile may have weight of one, similar to negative samples. For example, the weight of a positive training instance may be the sum of one and the quality score (e.g., $1+w_t$).

As another example, modifying a training instance may involve modifying the label of the training instance. For example, a negative label may be zero, while a positive label may be one. A label indicating a quality score (e.g., the corresponding presentation is associated with video-related events for the first and second quartiles) may have a value greater than one, such as $1+w_i$.

Example Process

Figure 2A:
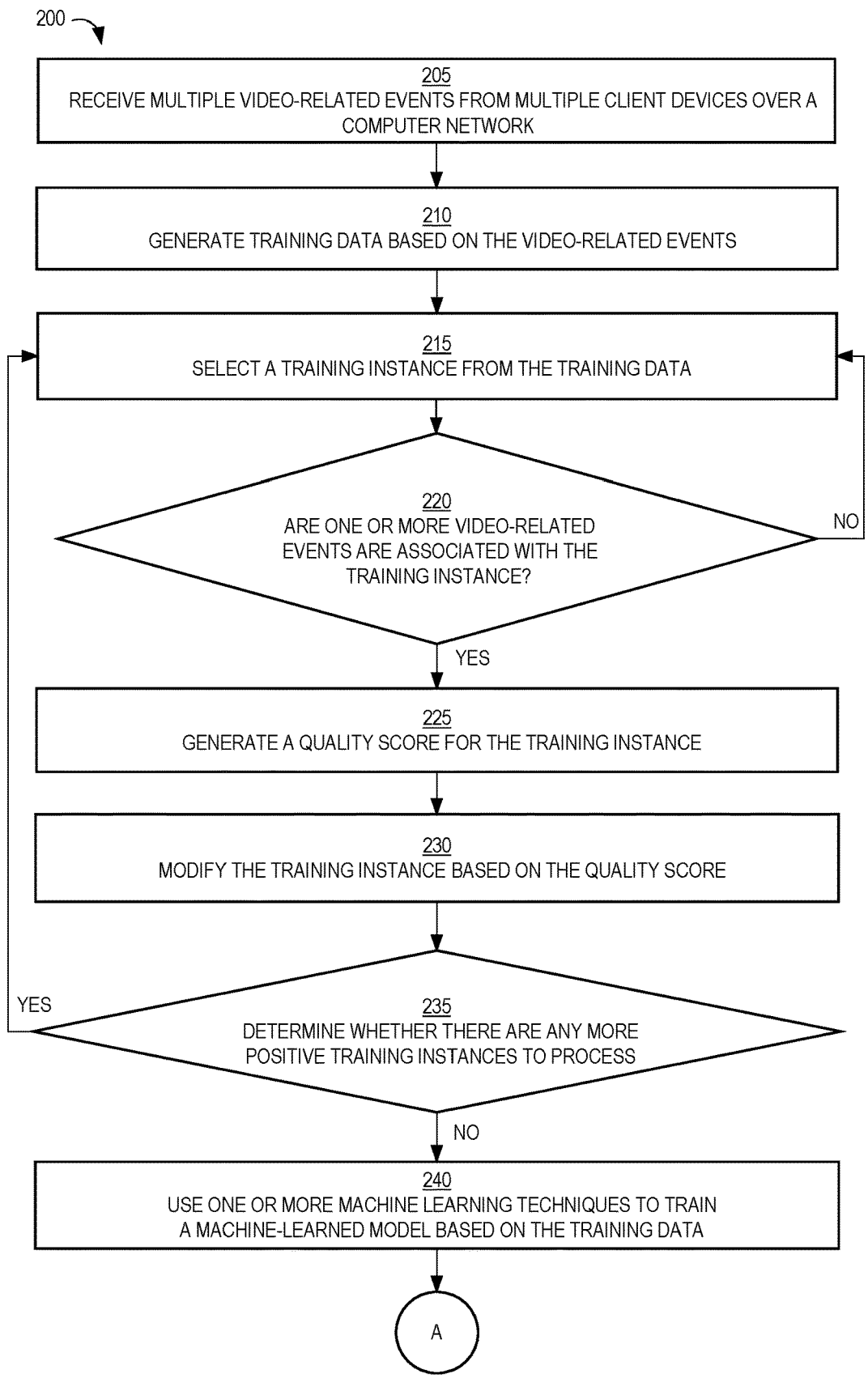
FIGS. 2A-2B is a flow diagram that depicts an example process for modifying training data and leveraging a machine-learned model that has been trained based on the modified training data, in an embodiment.
Figure 2B:
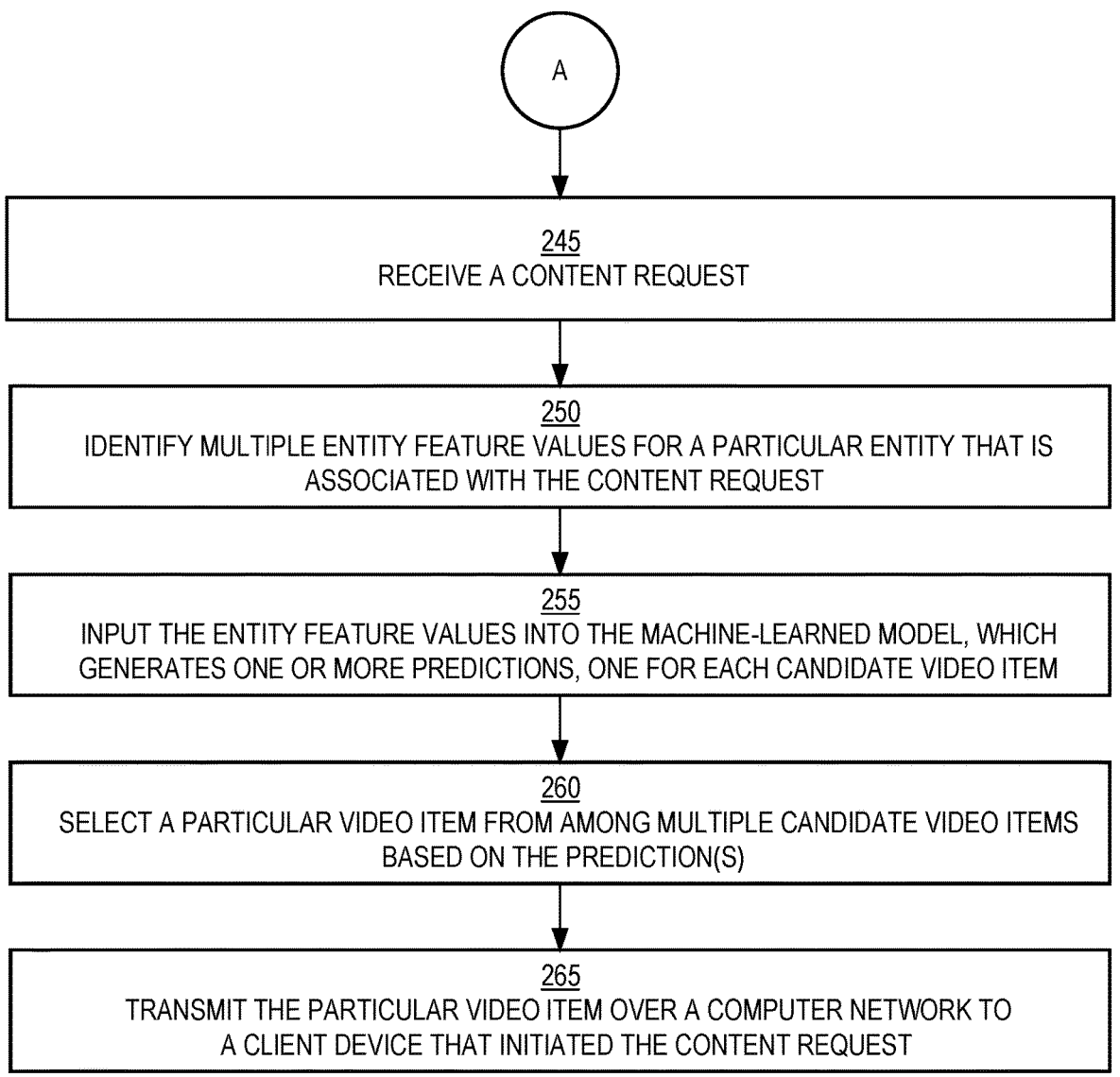

FIG. 2 is a flow diagram that depicts an example process 200 for modifying training data and leveraging a machine-learned model that has been trained based on the modified training data, in an embodiment.

At block 205, multiple video-related events are received from multiple client devices (e.g., one or more of client devices 142-146) over a computer network (e.g., the Internet). Each video related event is generated by a client application executing on one of the client devices. Each video-related event may include a client device identifier (e.g., IP address), a browser cookie, a mobile advertising identifier (MAID), and/or an entity identifier, such as a member identifier or an encrypted version thereof. Some of the video-related events indicate that an impression of a video item occurred. Others of the video-related events indicate a type of engagement of a video item. For example, a first event indicates a first type engagement (e.g., the first two seconds of the video being presented) and a second event indicates a second type of engagement (e.g., the first half of the video being presented) that is different than the first type of engagement. Thus, the client application detects which portion (or how much) of a video item is presented on a screen of the corresponding client device and generates an event indicating that a certain portion or (e.g., threshold) amount has been presented.

At block 210, training data is generated based on the video-related events. Each training instance corresponds to a single entity and indicates whether a particular action was performed (which may be different than one or more of the different types of engagement) relative to a particular video item. Each training instance also includes entity-specific features of the entity corresponding to the training instance. Each training instance may also include video-specific features.

At block 215, a training instance is selected. At the first iteration of block 215, the training instance that is selected may be the first positive training instance in a training set. Alternatively, the training instance is a randomly selected positive training instance from the training set. Negative training instances (or instances corresponding to presentations in which a minimum portion of the video item was not presented) may be skipped or not considered in process 200.

At block 220, it is determined whether one or more video-related events are associated with the training instance. In block 220, the video-related events that are analyzed are more than impression events that indicates that a minimum portion (e.g., the first two seconds) of a video item was presented to a user. Examples of a video-related event is an event that is generated after a certain lapse of time (e.g., thirty seconds) of presenting a video item and an event that is generated after a video portion at a quartile marker (e.g., 25% quartile) was presented.

A video-related event may be identified as being associated with the training instance if both are associated with a common identifier or set of common identifiers, such as a content item selection event identifier or a combination of a device or browser identifier, a content item identifier, and a timestamp.

If the determination in block 220 is positive, then process 200 proceeds to block 225; otherwise, process 200 returns to block 215, where another training instance is selected.

At block 225, a quality score is generated for the training instance based on the one or more video-related events identified for the training instance. For example, if the quality score is defined according to the following formula:

$$\sum_{j=1}^{4} \frac{I(q_j)}{p(q_j|l)}$$

then, for each video-related event that corresponds to a quartile j, a $p(q_j|l)$ (or $p(q_j)$) is determined and the result of $I(q_j)/p(q_j|l)$ (or $I(q_j)/p(q_j)$) is generated. Thus, if there are two video-related events associated with the training instance and one corresponds to j=1 and another corresponds to j=3, then $p(q_1|l)$ is determined, $p(q_3|l)$ is determined, $1/p(q_1|l)$ is computed, $1/p(q_s|l)$ is computed, and the sum of $1/p(q_1|l)$ and $1/p(q_3|l)$ is computed. The sum is the quality score for the training instance. In a related embodiment, the event corresponding to j=3 is discarded since that event was not preceded by an event corresponding to j=2. Thus, $1/p(q_3|l)$ is not computed or used to generate the quality score.

At block 230, the quality score is used to modify the training instance. For example, a weight of the training instance is replaced by the quality score (w) or increased by the sum of one and the quality score (i.e., 1+w). As another example, a label of the training instance is replaced by the quality score or is increased by the sum of one and the quality score.

At block 235, it is determined whether there are any more positive training instances to process. If so, process 200 returns to block 215; otherwise, process 200 proceeds to block 240.

At block 240, one or more machine learning techniques are used to train a machine-learned model based on the training data, at least some of the training instances of which have been modified by the corresponding quality scores. Examples of supervised machine learning algorithms include linear regression, logistic regression, decision tree, Naïve Bayes, random forest, and gradient boosting.

At block 245, a content request is received. The content request is initiated by a client device (e.g., client device 144) that interacts with a publisher system (e.g., publisher system 130), causing a content request to be transmitted (over a computer network) to content delivery system 120. The content request is for one or more content items.

At block 250, in response to receiving the content request, multiple entity feature values are identified for a particular entity (e.g., a user) that is associated with (or initiated) the content request. The content request may include an entity identifier, which is used to look up the entity feature values. Two or more of the entity feature values correspond to two or more of the types of engagements. Such entity feature values may be calculated on the fly or may be pre-computed values that are retrieved from storage.

At block 255, a prediction is generated by inputting the identified entity feature values into the machine-learned model. One or more feature values that are input to the machine-learned model may be video-specific features of a candidate video item. Thus, block 255 may repeat for each candidate video item that is identified as relevant to the particular entity. The prediction may represent a likelihood that the particular entity will view or select the candidate video item.

At block 260, a particular video item that includes video is selected, from among multiple candidate video items, based on the prediction(s). For example, the candidate video item that is associated with the highest score is selected. Block 260 may involve selecting multiple candidate video items, each being assigned to a different slot within a webpage, a feed, or other web content. The order in which the multiple candidate video items will be presented is based on their respective predictions, or scores generated by the machine-learned model.

At block 265, the particular video item is transmitted (over a computer network) to the client device that initiated the content request. For example, content delivery system 120 transmits, to the client device, a Uniform Resource Locator (URL) that identifies the particular video item. The client device then uses the URL to request (over a computer network) the particular video item (or at least one or a few frames of the particular video item) from a remote server that hosts the particular video item. As another example, content delivery system 120 transmits the particular video item (or a few frames thereof) directly to the client device.

If block 260 involves selecting multiple candidate video items, then block 265 involves transmitting multiple video items, or multiple references. The number of video items that are ultimately presented on the client device may depend on the size of the display screen of the client device and/or how far the user scrolls through a feed or a webpage that includes video items. For example, even though ten candidate video items are selected, only five are ultimately presented in an online feed because only two content items are able to be presented at once in the feed and the user scrolls down the online feed to view only a few more content items.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
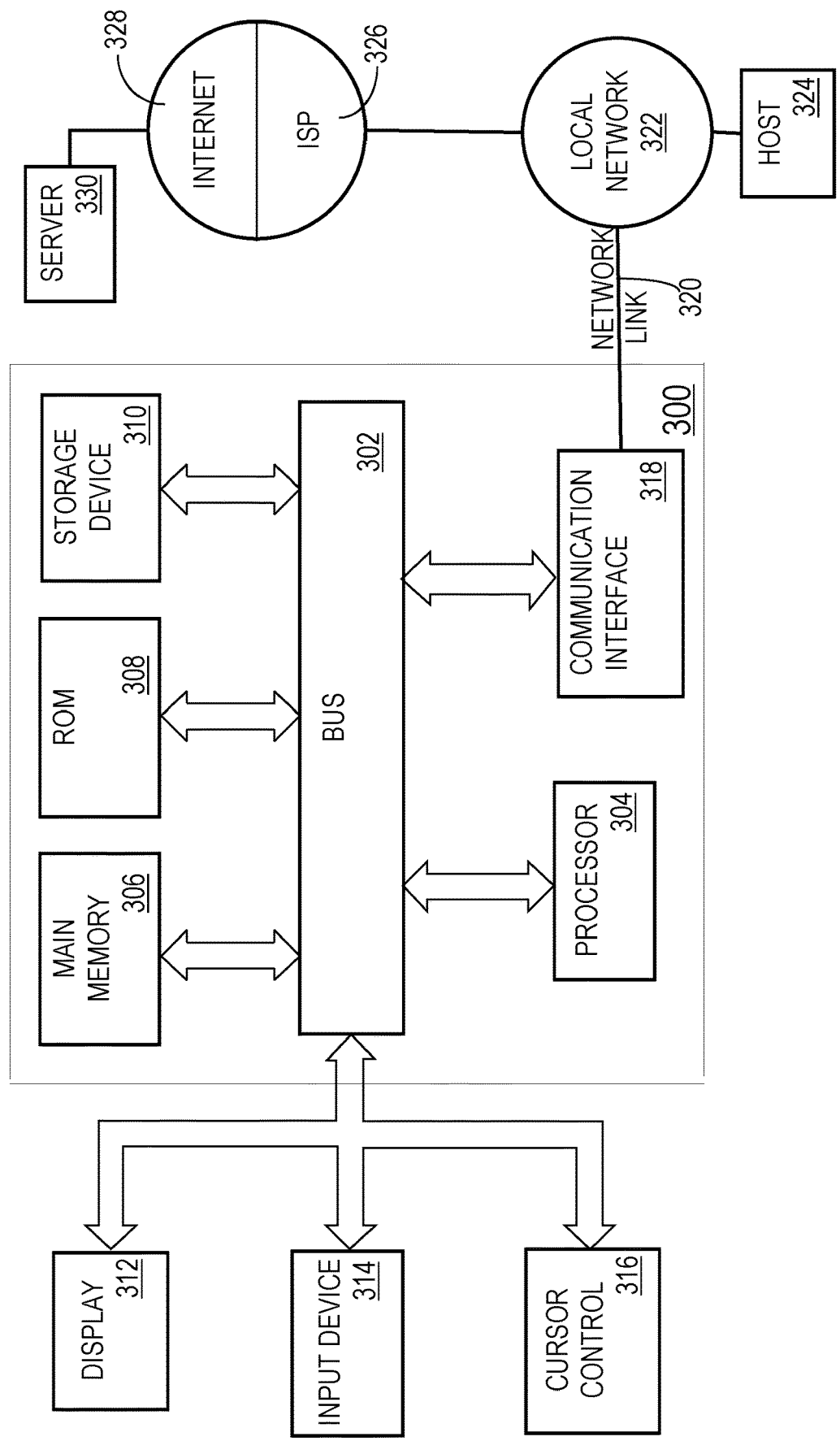
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying training data that is generated based on video presentation data that indicates a plurality of video items were presented to a plurality of entities;
   wherein the training data comprises a plurality of training instances, each of which indicates a presentation of at least a portion of a video item to an entity in the plurality of entities;
   for each training instance in a subset of the plurality of training instances:
   computing a quality metric of the presentation of the video item indicated in said each training instance;
   modifying said each training instance based on the quality metric, wherein modifying said each training instance comprises:
   adding a weight, that is based on the quality metric, to said each training instance, or
   modifying a label of said each training instance based on the quality metric;
   after modifying one or more training instances in the plurality of training instances, training a model using one or more machine learning techniques;
   in response to a content request, using the model to determine whether to transmit a particular video item over a computer network to a computing device of a particular entity;
   wherein the method is performed by one or more computing devices;
   in response to receiving a content request:
   determining an identity of the particular entity that initiated the content request; based on the identity, identifying a Plurality of candidate video items for presentation to the particular entity;
   identifying a first plurality of feature values of the particular entity;
   for each candidate video item in the Plurality of candidate video items:
   identifying a second plurality of feature values associated with said each candidate video item;
   inserting the first plurality of feature values and the second Plurality of feature values into the model to generate a score for said each candidate video item;
   based on the score for each candidate video item in the Plurality of candidate video items, selecting the particular video item;
   causing the particular video item to be transmitted over the computer network to the computing device of the particular entity.

2. The method of claim 1, further comprising:
   identifying a plurality of video-related events indicating that video items were presented to entities, wherein the plurality of video-related events includes (1) a first video-related event indicating that a portion of a first video item was presented to a first entity and (2) a second video-related event indicating that a portion of a second video item was presented to a second entity;
   based on the plurality of video-related events, generating a probability of a particular type of event;
   wherein computing the quality metric of said each training instance is based on the probability.

3. The method of claim 2, wherein the probability is based on only video-related events that pertain to the plurality of training instances.

4. The method of claim 2, wherein the particular type of event is viewing a particular quantile of a video item.

5. The method of claim 2, further comprising:
   assigning the plurality of video items to a plurality of time buckets, wherein assigning comprises, for each video item of the plurality of video items:
   determining a video length of said each video item;
   assigning said each video item to a time bucket, of the plurality of time buckets, that is associated with the video length;
   wherein, after the plurality of video items are assigned to the plurality of time buckets, the plurality of time buckets includes (1) a first time bucket that is associated with a first subset of the plurality of video items and (2) a second time bucket that is associated with a second subset of the plurality of video items;
   wherein the plurality of training instances is a first plurality of training instances that pertain to the first subset of the plurality of video items;
   wherein a second plurality of training instances pertain to the second subset of the plurality of video items;
   wherein generating the probability is based on the first plurality of training instances and not the second plurality of training instances.

6. The method of claim 2, further comprising:
   generating a plurality of probabilities, one for each event of multiple types of events that includes the particular type of event;
   wherein computing the quality metric of said each training instance is based on the plurality of probabilities.

7. The method of claim 6, wherein computing the quality metric of the presentation comprises determining, for each event of the multiple events, a ratio of (1) an indication of whether said each event occurred during the presentation of the video item and (2) a certain probability of the plurality of probabilities.

8. The method of claim 1, further comprising:
   receiving, from a first computing device, first video-related event that indicates that a first portion of a first video item of the plurality of video items was presented on the first computing device;
   receiving, from the first computing device, second video-related event that indicates that a second portion, of the first video item, that is different than the first portion, was presented on the first computing device;
   wherein the video presentation data includes the first video-related event and the second video related event.

9. A method comprising:
   identifying training data that is generated based on video presentation data that indicates a plurality of video items were presented to a plurality of entities;

wherein the training data comprises a plurality of training instances, each of which indicates a presentation of at least a portion of a video item to an entity in the plurality of entities;

for each training instance in a subset of the plurality of training instances:

computing a quality metric of the presentation of the video item indicated in said each training instance;

modifying said each training instance based on the quality metric; after modifying one or more training instances in the plurality of training instances, training a model using one or more machine learning techniques; in response to a content request, using the model to determine whether to transmit a particular video item over a computer network to a computing device of a particular entity;

wherein the method is performed by one or more computing devices;

in response to receiving a content request:

determining an identity of the particular entity that initiated the content request;

based on the identity, identifying a plurality of candidate video items for presentation to the particular entity;

identifying a first plurality of feature values of the particular entity;

for each candidate video item in the plurality of candidate video items:

identifying a second plurality of feature values associated with said each candidate video item;

inserting the first plurality of feature values and the second plurality of feature values into the model to generate a score for said each candidate video item;

based on the score for each candidate video item in the plurality of candidate video items, selecting the particular video item;

causing the particular video item to be transmitted over the computer network to the computing device of the particular entity.

10. One or more non-transitory storage media storing instructions which, when executed by one or more processors, cause:

identifying training data that is generated based on video presentation data that indicates a plurality of video items were presented to a plurality of entities;

wherein the training data comprises a plurality of training instances, each of which indicates a presentation of at least a portion of a video item to an entity in the plurality of entities;

for each training instance in a subset of the plurality of training instances:

computing a quality metric of the presentation of the video item indicated in said each training instance;

modifying said each training instance based on the quality metric, wherein modifying said each training instance comprises:

adding a weight, that is based on the quality metric, to said each training instance; or modifying a label of said each training instance based on the quality metric after modifying one or more training instances in the plurality of training instances, training a model using one or more machine learning techniques;

in response to a content request, using the model to determine whether to transmit a particular video item over a computer network to a computing device of a particular entity;

in response to receiving a content request:

determining an identity of the particular entity that initiated the content request;

based on the identity, identifying a plurality of candidate video Items for presentation to the particular entity;

identifying a first plurality of feature values of the particular entity;

for each candidate video item in the plurality of candidate video items:

identifying a second plurality of feature values associated with said each candidate video item;

inserting the first plurality of feature values and the second plurality of feature values into the model to generate a score for said each candidate video item;

based on the score for each candidate video item in the plurality of candidate video items, selecting the particular video item; causing the particular video item to be transmitted over the computer network to the computing device of the particular entity.

11. The one or more non-transitory storage media of claim 10, wherein modifying said each training instance comprises adding the weight, that is based on the quality metric, to said each training instance.

12. The one or more non-transitory storage media of claim 10, wherein the instructions, when executed by the one or more processors, further cause:

identifying a plurality of video-related events indicating that video items were presented to entities, wherein the plurality of video-related events includes (1) a first video-related event indicating that a portion of a first video item was presented to a first entity and (2) a second video-related event indicating that a portion of a second video item was presented to a second entity;

based on the plurality of video-related events, generating a probability of a particular type of event;

wherein computing the quality metric of said each training instance is based on the probability.

13. The one or more non-transitory storage media of claim 12, wherein the probability is based on only video-related events that pertain to the plurality of training instances.

14. The one or more non-transitory storage media of claim 12, wherein the particular type of event is viewing a particular quantile of a video item.

15. The one or more non-transitory storage media of claim 12, wherein the instructions, when executed by the one or more processors, further cause:

assigning the plurality of video items to a plurality of time buckets, wherein assigning comprises, for each video item of the plurality of video items:

determining a video length of said each video item;

assigning said each video item to a time bucket, of the plurality of time buckets, that is associated with the video length;

wherein, after the plurality of video items are assigned to the plurality of time buckets, the plurality of time buckets includes (1) a first time bucket that is associated with a first subset of the plurality of video items and (2) a second time bucket that is associated with a second subset of the plurality of video items;

wherein the plurality of training instances is a first plurality of training instances that pertain to the first subset of the plurality of video items;

wherein a second plurality of training instances pertain to the second subset of the plurality of video items;

wherein generating the probability is based on the first plurality of training instances and not the second plurality of training instances.

16. The one or more non-transitory storage media of claim 12, wherein the instructions, when executed by the one or more processors, further cause:
generating a plurality of probabilities, one for each event of multiple types of events that includes the particular type of event;
wherein computing the quality metric of said each training instance is based on the plurality of probabilities.

17. The one or more non-transitory storage media of claim 16, wherein computing the quality metric of the presentation comprises determining, for each event of the multiple events, a ratio of (1) an indication of whether said each event occurred during the presentation of the video item and (2) a certain probability of the plurality of probabilities.

18. The one or more non-transitory storage media of claim 10, wherein the instructions, when executed by the one or more processors, further cause:
receiving, from a first computing device, first video-related event that indicates that a first portion of a first video item of the plurality of video items was presented on the first computing device;
receiving, from the first computing device, second video-related event that indicates that a second portion, of the first video item, that is different than the first portion, was presented on the first computing device;
wherein the video presentation data includes the first video-related event and the second video related event.

* * * * *